United States Patent [19]

Delcroix

[11] Patent Number: 5,437,304
[45] Date of Patent: Aug. 1, 1995

[54] DEVICE FOR ALTERNATE ADMISSION OF A LIQUID OR A PRESSURIZED GAS TO ONE OR MORE MOULDS USED IN PLASTICS PROCESSING

[76] Inventor: Jean-Louis Delcroix, Avenue Meynard, Villa No. 12, 84600 Valréas, France

[21] Appl. No.: 22,999
[22] Filed: Feb. 26, 1993

[30] Foreign Application Priority Data
Mar. 30, 1992 [DE] Germany .................. 42 10 312.6

[51] Int. Cl.⁶ .................. F16K 11/07; F16K 11/083
[52] U.S. Cl. .................. 137/595; 137/625.18; 137/625.19
[58] Field of Search .............. 137/595, 625.18, 625.19; 251/151

[56] References Cited

U.S. PATENT DOCUMENTS

| | | | |
|---|---|---|---|
| 1,391,676 | 9/1921 | Finley | 137/595 X |
| 2,621,365 | 12/1952 | Deschamps | 137/625.19 X |
| 3,098,506 | 7/1963 | Spragens | 137/625.19 |
| 3,595,270 | 7/1971 | McNeal | 137/595 |
| 4,672,728 | 6/1987 | Nimberger | 251/151 X |

FOREIGN PATENT DOCUMENTS

1296333  6/1965  Germany .
3603274  8/1987  Germany .

OTHER PUBLICATIONS

Japanese Patent Abstracts M-487, Jun. 11, 1986.

*Primary Examiner*—Stephen M. Hepperle
*Attorney, Agent, or Firm*—Klein & Vibber

[57] ABSTRACT

A device is provided that permits admission of air or water to one or more molds. It includes at least two three-way valves that move together between a position admitting and exhausting air, a position admitting and exhausting water, and a position blocking all ports.

7 Claims, 4 Drawing Sheets

DEVICE FOR ALTERNATE ADMISSION OF A LIQUID OR A PRESSURIZED GAS TO ONE OR MORE MOULDS USED IN PLASTICS PROCESSING

BACKGROUND OF THE INVENTION

The invention pertains to a device for alternate admission of a liquid or a gas under pressure to one or more molds used in plastics processing.

Molds for plastics processing, such as injection molds, blow molds or extrusion dies, must generally be kept at a certain temperature, which in the injection and blow molding processes also effects a cooling of the plasticated compound introduced into the mold, and thus its solidification so that the molded part can be removed as quickly as possible from the mold. The temperature must be high enough so that the plastic will fill the mold completely and not "freeze" before the mold is completely filled. In extrusion processes the extrusion die generally has to be heated sufficiently so that the extrusion product with a perfect surface can be drawn off continuously and cooled in a cooling bath. In order to be able to utilize the very expensive plastics processing machines as effectively as possible, another requirement is the ability to replace molds as quickly as possible, so as to have the shortest possible downtimes for the machines when setting it up for a different injection or blow molding part or a different extrusion section.

It is known for this purpose to use quick-acting couplers as the connections to the molds. These known couplers can be easily released and are designed so that when the coupler is released no fluid can be discharged from the lines and the molds themselves.

Since the molds are generally cooled with water, occasionally water will remain inside the cavities of the molds over a longer period of time. This retained water can cause corrosion in these cavities. Furthermore, such quick-acting couplers are expensive and susceptible to malfunctioning so that simple quick-acting couplers which do not automatically close when detached are preferred. The use of such simple couplers causes fluid to drain out of the mold when the coupler is detached, which in turn may cause soiling and corrosion on the outside of the molds and in the mold cavities, the latter being far more critical.

It is also important, in order to achieve high utilization rates for the machines, that the molds be quickly brought up to the desired temperature.

SUMMARY OF THE INVENTION

It is a general object of the invention to devise a configuration with a simple structure and allowing for quick changing of the molds and bringing them to the desired temperature, without there being the hazard of corrosion and soiling due to liquid remaining in the molds.

Based on this objective, it is proposed by way of invention that in a device of the type mentioned hereinabove one or more molds be joined with at least one pair of three-way valve elements featuring positively coupled shut-off elements, with a connection for liquid feed and a compressed air connection, as well as with an outlet connected with a feed for at least one mold at the first three-way valve element, an inlet joined with a drain for at least one mold, a connection for liquid drain and an outlet for liquid and compressed gas which may possibly terminate in a catchment container at the second three-way valve element, a channel arrangement in the valve body, and the moving shut-off component in the two coupled three-way valve elements to make a connection between the connection for liquid feed and the outlet connected with the mold feed at the first three-way valve element as well as between the inlet joined with the outlet for the mold and the connection for a liquid drain at the second three-way valve element when the coupled three-way elements are in a first setting, for a connection between the compressed gas connection and the outlet joined with the feed to the mold at the first three-way valve element, as well as between the inlet joined with the outlet at the mold and the outlet and terminating in the catchment container for liquid and compressed gas at the second three-way valve element when the coupled three-way valve elements are in a second setting, and for blocking all connections, inlets and outlets at both three-way valve elements when the two coupled three-way valve elements are in a third position.

With the improved device of the invention it is possible in a first stage to admit liquid to one or more molds whereby the liquid can preferably recirculate in a closed system and thereby be tempered, i.e. cooled or heated, in a known fashion. In the second position the liquid circuit is isolated from the mold and the liquid present in the mold is driven out of the mold with pressurized gas, as a rule with compressed air. The liquid which is thereby displaced is collected in a container and the compressed air continues to be passed through the mold until the mold and the lines are completely dry. Then all connections, inlets and outlets are blocked so that the mold can be detached from the three-way valve elements, preferably by means of simple quick-acting couplers, and replaced with another mold.

The device proposed by way of invention can be located in the immediate vicinity of one or more molds in injection molding machines, blow molding machines or extrusion machines and is designed so as to preclude operating errors. The device proposed by way of invention exhibits only three valve settings, an operating setting in which a liquid, preferably water, is admitted to the mold, a drain setting in which compressed air is admitted to the mold and a blocked setting in which the mold or molds can be exchanged.

The device proposed by way of invention finds particularly advantageous application in all systems in which both the liquid feed and the liquid drain are under a certain pressure, which incurs the risk that the lines would empty if the connection to a mold were detached. This is particularly important to avoid in systems operating with a closed circuit where liquid is being discharged and air is entering, this being necessary in order to avoid damage in the liquid circuit, which can occur particularly at temperature regulation devices which may be used here. This requirement is satisfied with certainty in the device proposed here since in no setting of the three-way valve element can air enter the circuit.

The three-way valve elements may exhibit rotatable shut-off components, coupled one with another, preferably in the form of coaxial, conical plugs. These plugs may be situated in valve bodies which are fastened together or in a common valve body for both plugs.

Conical plugs offer the advantages that they can be manufactured for good sealing qualities by moving them in at their seats and that no undesired overlapping of the openings can occur in intermediate positions. The two plugs must nonetheless be moved into their seats separately one from another and require a certain spring pre-load to achieve a good seal.

The shut-off elements can also be in the form of piston-type sliders which may be located either along parallel axes or coaxial one to the other. Piston-type sliders are simple in design and feature a through bore where the slider elements are arranged coaxially, which can be manufactured simply and precisely. The piston-type sliders themselves can also be machined very precisely so that they can move in the corresponding bore without additional seals; in such an embodiment they are, however, susceptible to corrosion and wear due to particles swept along in the liquid or the compressed gas, so that in this version they are best used with oil as the liquid and filtered compressed air.

Furthermore, by utilizing additional sealing elements at the piston-type sliding elements reduces the sensitivity to corrosion and wear at the piston-type sliding elements themselves; the sealing elements must however be replaced from time to time.

BRIEF DESCRIPTION OF THE DRAWING

With these and other objects in view, which will become apparent in the following detailed description the present invention, which is shown by example only, will be clearly understood in connection with the accompanying drawing, in which.

DETAILED DESCRIPTION

Figure 1:
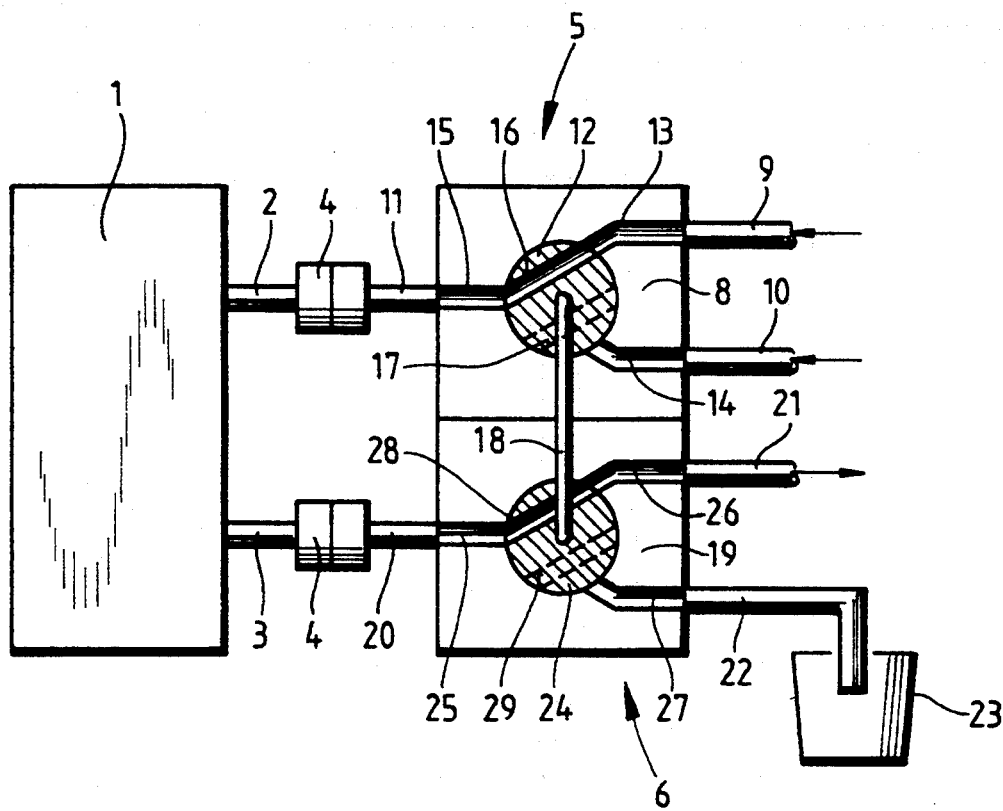
FIG. 1 is a schematic top sectional view showing a pair of coupled three-way valve elements in the first setting.

There is illustrated in FIGS. 1 to 6 a mold 1 which is coupled to a pair of three-way valve elements 5, 6. The mold features a feed 2 and a drain 3, which are joined by way of quick-acting couplers 4 with an outlet 11 at the first three-way valve element 5 and an inlet 20 at the second three-way valve element 6.

Figure 2:
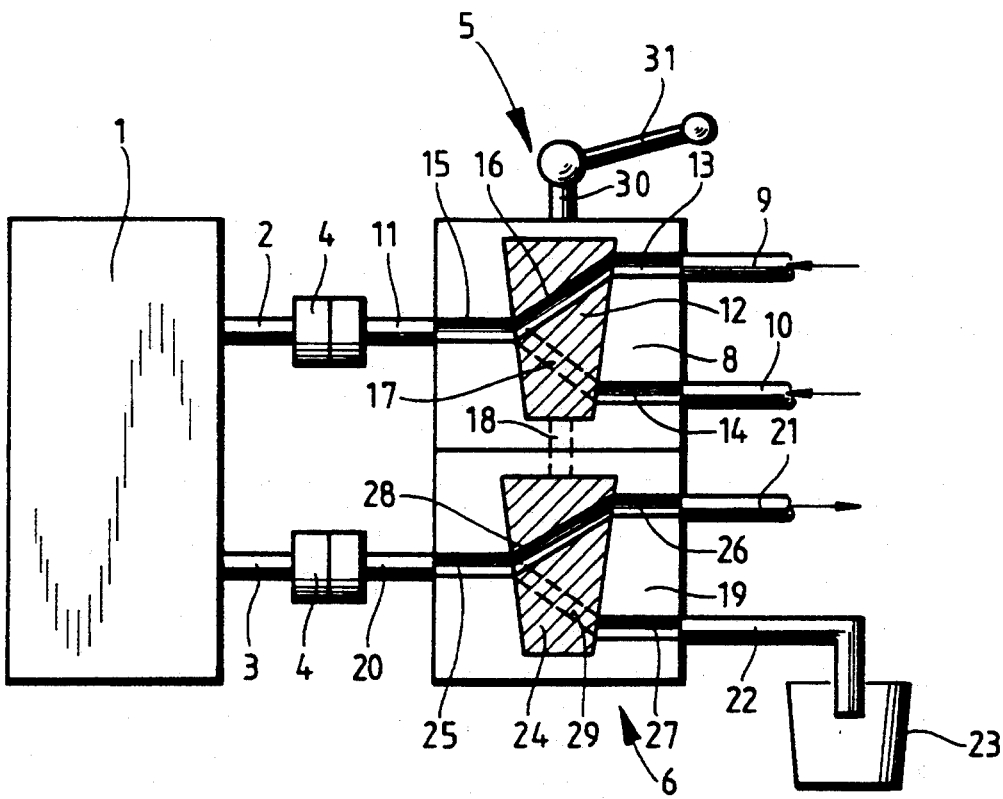
FIG. 2 is a side cross-sectional view of the three-way valve elements in the first setting.

The three-way valve element 5 comprises a valve body 8, which in the interest of simplicity is illustrated in FIG. 1 as disposed next to a valve body 19 for the three-way valve element 6. This type of depiction was selected to make clear the functioning at the various settings of the valve elements 5 and 6. As illustrated in FIG. 2, the valve bodies 8, 19 are in fact positioned one above the other and joined one with another, e.g. bolted. It is, however, also possible to manufacture the valve bodies 8, 19 from a single piece provided that all the parts of the three-way valve elements 5, 6 are properly operatively mounted in the single piece.

The valve body 8 exhibits a connection 9 to feed a liquid, e.g. water. Also provided is a connection 10 for a pressurized gas, e.g. compressed air. Located at the center of the valve body 8 is a conical plug 12 to which a channel 13 leads from the connection 9, a channel 14 leads from the connection 10, and a channel 15 leads to the outlet 11. The plug 12 exhibits two channels 16, 17 of which channel 16 when in the setting illustrated in FIGS. 1 and 2 forms a conduit between the water connection 9 and the feed 2 to the mold 1 via the channels 13, 15 and the outlet 11.

The second three-way valve element 6 is similarly constructed. It comprises a valve body 19 with an inlet 20, which is joined via the quick-acting coupler 4 with the drain 3 of the mold 1. A connection 21 for draining away the liquid is provided and an outlet 22 which terminates in a catchment container 23. Also located in the valve body 19 is a conical plug 24 which is coupled with the plug 12 by means of a coupling element 18, e.g. a hexagonal rod, in a fashion so as to prevent relative rotation. When in the setting illustrated, the plug 24 is in communication with the inlet 20 via a channel 25 and with the connection 21 to drain the fluid via a channel 26 and a channel 28 disposed in the plug 24.

A further channel 29 is shown only with dotted lines to indicate that at the setting illustrated in FIGS. 1 and 2 it faces the wall of the conical seat for the plug 24 without making any connection. This also applies to the channel 17 shown with dotted lines in the plug 12 of the first three-way valve element 5.

The two plugs 12, 24, joined with another so as to prevent relative rotation. The two plugs can be rotated by means of a common shaft 30 which extends out of the valve body 8 and on the end of which there is mounted an actuator lever 31. The common shaft can adjust the position of the two plugs into three settings, the first of which is illustrated in FIGS. 1 and 2, in which setting water is admitted to the mold 1 by way of the connection 9. The water can flow out through the connection 21 and return in a fashion not illustrated to a closed circuit or if indicated via a temperature regulation unit not illustrated and back to the connection 9. The compressed air connection 10 and the outlet 22, which leads to the catchment container 23, are closed in the setting illustrated in FIGS. 1 and 2.

Figure 3:
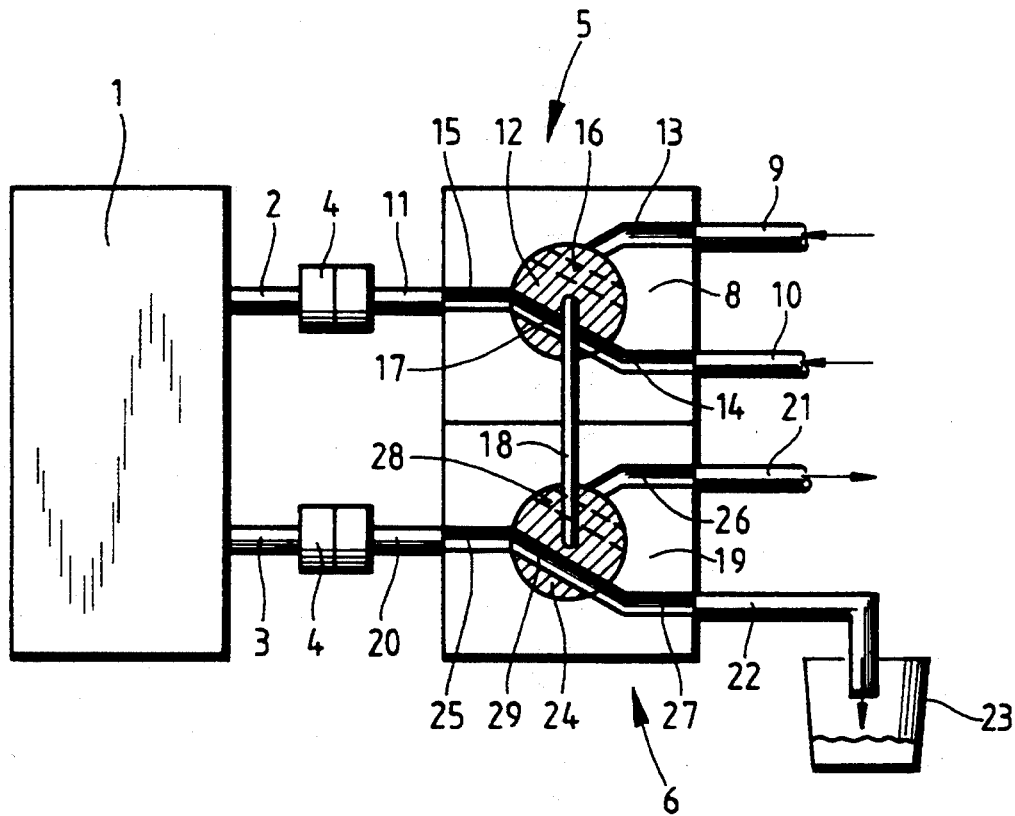
FIG. 3 is a schematic top sectional view showing a pair of coupled three-way valve elements in the second setting.
Figure 4:
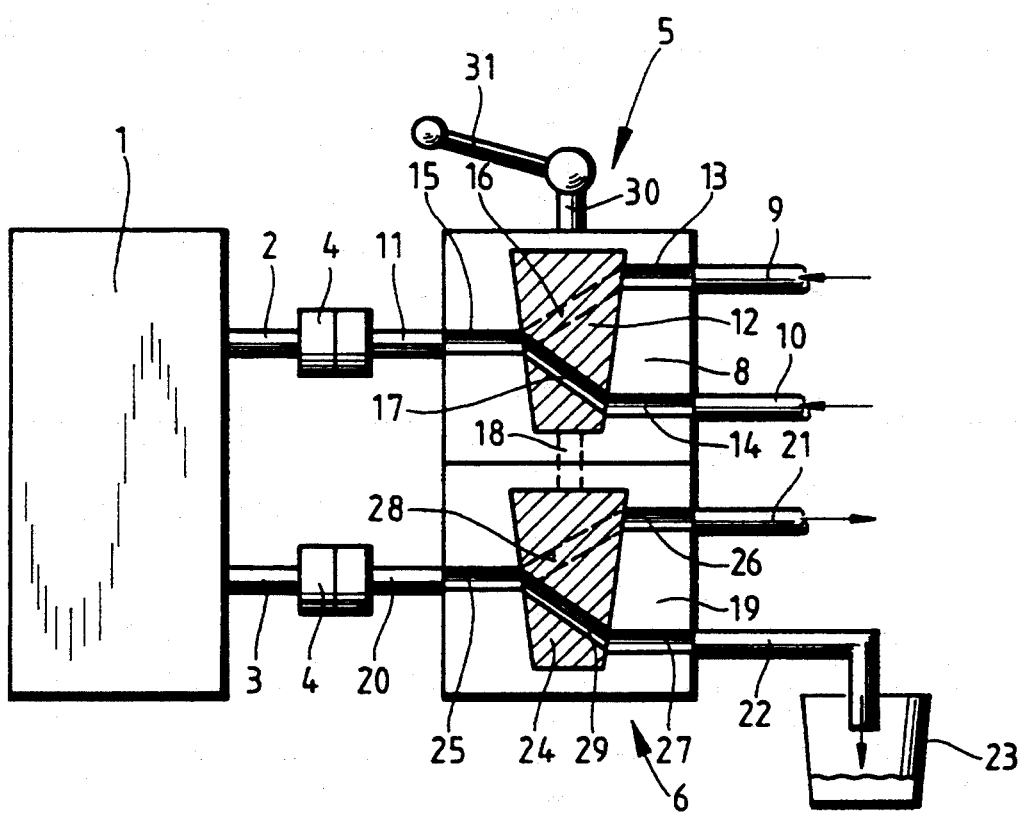
FIG. 4 is a side cross-sectional view of the three-way valve elements in the second setting.
Figure 5:
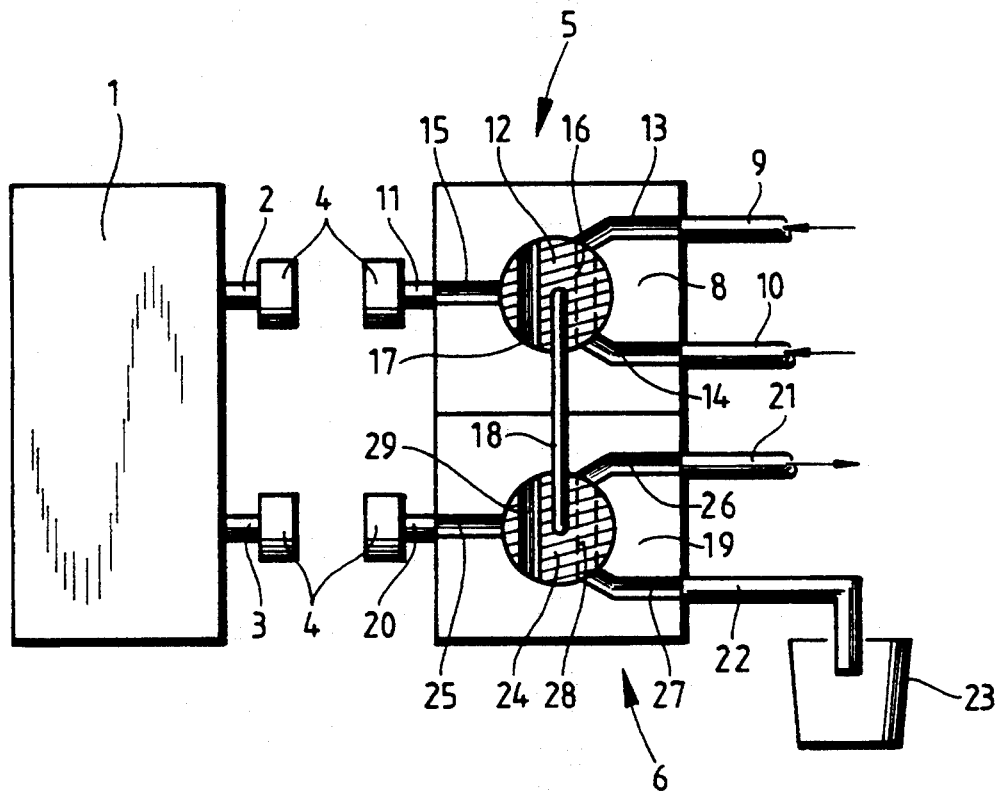
FIG. 5 is a schematic top sectional view showing a pair of uncoupled three-way valve elements in the third setting.
Figure 6:
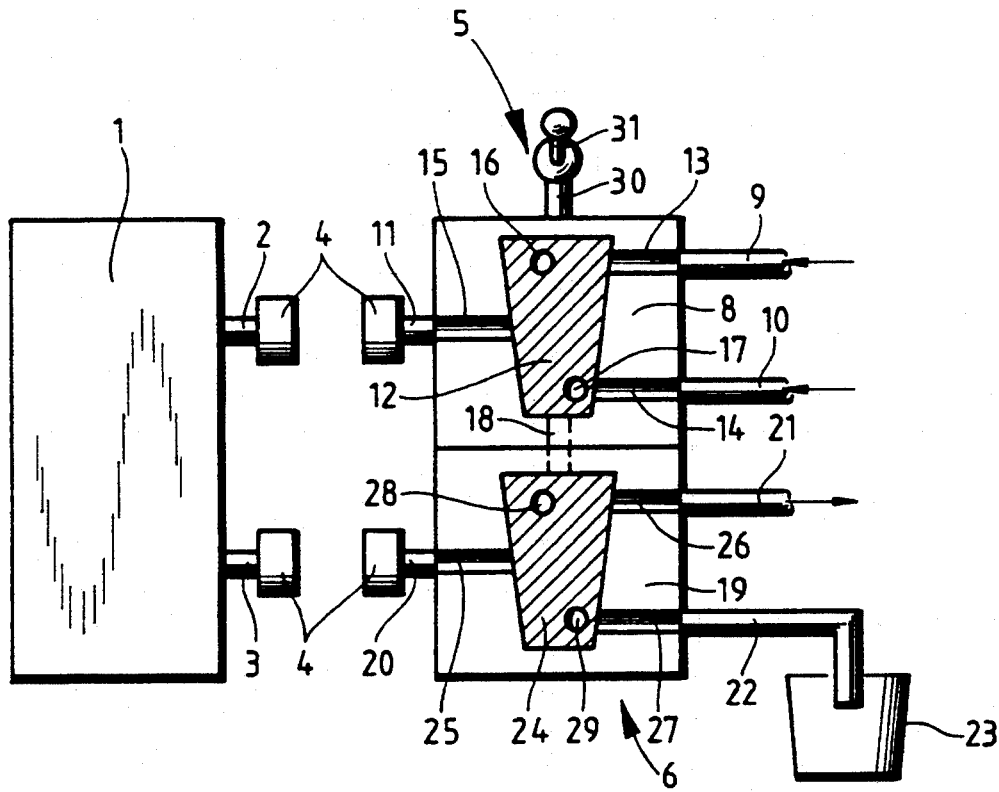
FIG. 6 is a side cross-sectional view of the three-way valve elements in the third setting.

If the mold 1 is to be replaced with another mold, the plugs 12, 24 are rotated by means of the actuator lever 31 and brought into the setting illustrated in FIGS. 3 and 4. In this position there is communication between the compressed air connection 10 and the outlet 11 of the first three-way valve element 5 via the channels 14, 15 in the valve body 8 and the channel 17 in the conical plug 12.

Due to the mechanical coupling of the plugs 12, 24, there is also formed a connection between the inlet 20 and the outlet 22 of the second three-way valve element 6 via the channels 25, 27 in the valve body 19 and the channel 29 in the plug 24. In this setting compressed air is admitted to the mold 1, driving the water out of the mold. This water is collected in the catchment container 23. The setting illustrated in FIGS. 3 and 4 is maintained until the mold has been dried completely by the admission of compressed air. Then the plugs 12, 24 are brought into the setting illustrated in FIGS. 5 and 6, in which all channels 13 to 17 and 25 to 29 are blocked so that the quickacting couplers 4 can be released and the mold 1 replaced. Once the new mold I has been attached to the three-way valve elements 5, 6 via the quick-acting couplers 4, the actuator lever 31 is used to return the plugs 12, 24 to the first position, illustrated in FIGS. 1 and 2, as a consequence of which water can again be admitted to the new mold 1.

Thus the improved device of tile invention facilitates the changing of the molds which can be effected simply and quickly. Furthermore, the device of the invention assures that there is no danger that water will drain unnecessarily from the lines and be wasted, that compressed air will be used unnecessarily, or that devices located upstream from the three-way valve elements 5, 6 will suffer damage. Malfunctioning is effectively eliminated when using the device which is the subject of the invention.

Figure 7:
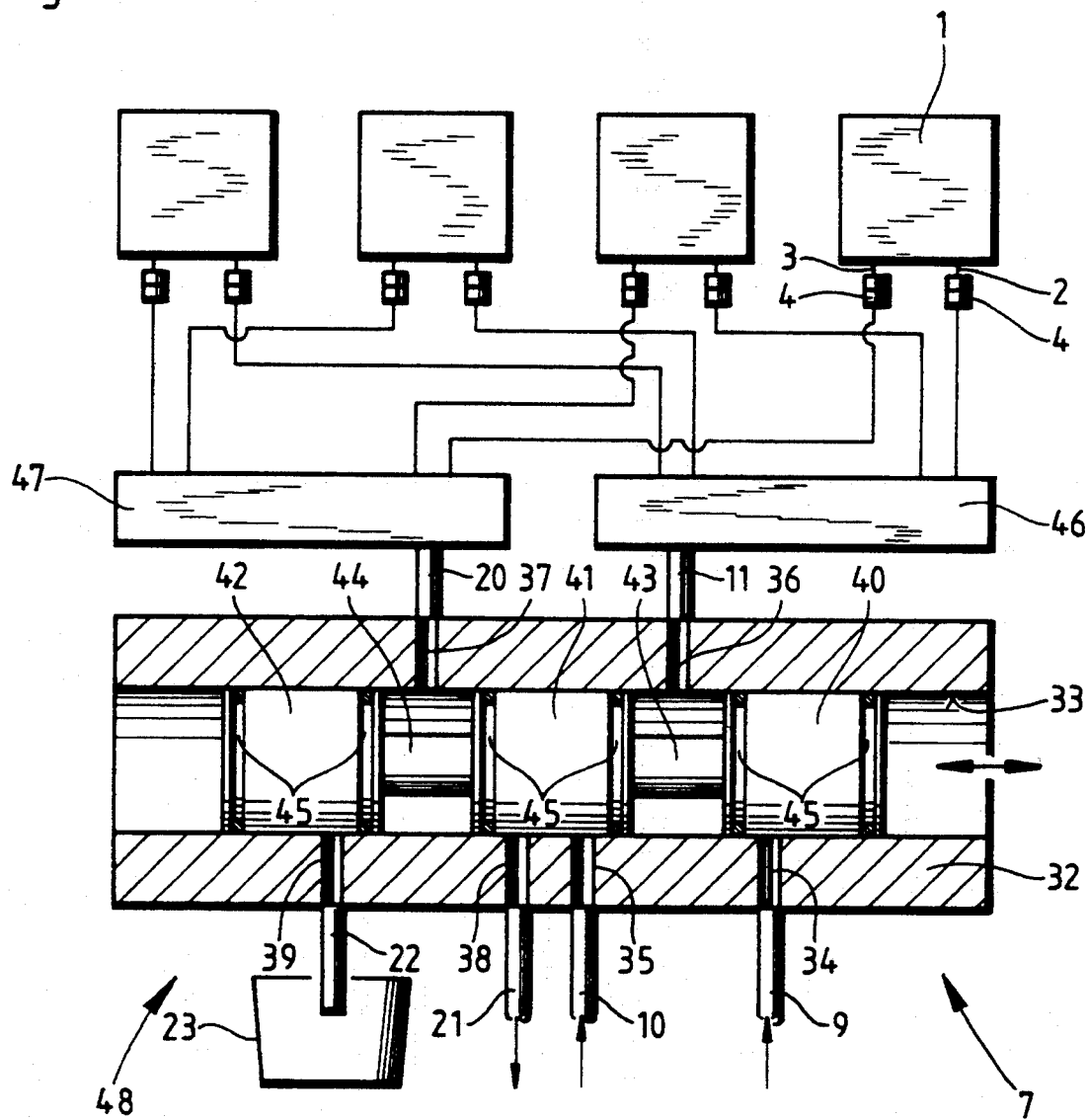
FIG. 7 a schematic side view of a pair of three-way valve elements in accordance with another embodiment in the third setting.

The embodiment illustrated in FIG. 7 comprises, in regard to the three-way valve elements 7, 48, a common valve body 32 with a cylindrical bore 33 in which three piston sliders 40, 41, 42, are joined by connecting shafts 43, 44 of smaller diameter than the cylinders 40, 41, 42. The cylinders 40, 41, 42 are sealed by means of O-ring seals 45. Like the embodiment corresponding to FIGS. 1 to 6, the valve body 32 exhibits a connection 9 for liquid feed, a compressed gas connection 10, an outlet 11, an inlet 20, a connection 21 to drain away the liquid and an outlet 22 terminating in a catchment container 23. The outlet 11 is joined by way of a manifold 46 with four molds 1. For sake of simplicity of illustration the one pair of three-way valve elements 5, 6 (embodiment of FIGS. 1–6) or 7, 48 (embodiment of FIG. 7) can be connected not only to a single mold 1 but also to multiple molds 1.

In the embodiment of FIG. 7 a radial bore 34 leads from the connection 9 to the cylindrical bore 33. At a distance therefrom, measured axially with respect to the bore 33, a radial bore 35 leads from the compressed gas connection 10 to the cylindrical bore 33. A further radial bore 36 is located approximately midway between the bores 34, 35 in the valve body 32, leading from the cylindrical bore 33 to the outlet 11. These radial bores, 34, 35, 36 form in conjunction with the neighboring piston sliders 40, 41 the first three-way valve element 7.

The second three-way valve element 48 is formed by a corresponding radial bore 37 mating with the inlet 20, a radial bore 38 mating with the connection 21 for the liquid drain, a radial bore 39 mating with the outlet 22, and neighboring piston sliders 41, 42. Located between the piston sliders 40, 41 and 41, 42 are in each case the connecting shafts 43, 44, which leave an annular space free.

The spacing of the piston sliders 40, 41, 42 and the neighboring O-ring seals 45 is selected so that in the position illustrated in FIG. 7 the radial bores 34, 35, 38, 39 are covered by the piston sliders 40, 41, 42, while the bores 36, 37 intersect with the annular space around the connector elements 43, 44. It is clear that in the position illustrated there is no communication between the radial bores 34 to 39 in the valve body 32, which corresponds to the third setting illustrated in FIGS. 5 and 6, in which all channels are blocked so that the quick-acting couplers 4 in the lines 2, 3 at the molds 1 can be released in order to change out one or more molds, all the water having previously been driven out of the molds 1 and the manifolds 46, 47 by means of compressed air.

In the operational setting the piston sliders 40, 41 together with the connecting shafts 43, 44 are shifted into a position far enough to the right in which position the piston sliders 40, 41 are positioned the right of the radial bores 34, 38, so that there is communication from the connection 9 to outlet 11 via the bore 34, the annular space around the connecting shaft 43 and the bore 36, as well as between the inlet 20 and the connection 21 to drain away the liquid via the radial bore 37, the annular space around the connecting shaft 44 and the radial bore 38. In this position the water entering at the connection 9 can flow unrestricted into the molds 1 and return to the connection 21, whence it is routed, either into a tank, to a drain or into a non-illustrated closed circuit back to the connection 9.

In order to drive the water out of the molds, compressed air is applied via the connection 10 by shifting the piston sliders 40 to 44 far enough to the left that communication is established between the radial bores 35, 36 via the annular space around the connecting shaft 43 as well as between the radial bores 37, 39 via the annular space around the connecting shaft 44. Here the liquid is driven out of the molds 1 by means of the compressed air admitted at the connection 10, flowing through the outlet 22 into the catchment container 23 indicated in the drawing.

The valve embodiment illustrated in FIG. 7 operates therefore in a similar manner as for the embodiment shown in FIGS. 1 to 6 to achieve essentially an identical function.

The invention is not limited to the embodiments illustrated and described herein of a device for alternate admission of a liquid or a gas under pressure to molds used in plastic processing, but is intended to include other variations which include the concept and spirit of this invention.

I claim:

1. Device for alternate admission of a liquid or a gas under pressure to one or more moulds (1) used in plastics processing, comprising at least one pair of three-way valve elements (5, 6, 7, 48) with shut-off components (12, 24; 40 to 44) which are positively coupled one with another, a connection (9) for the admission of water and a compressed air connection (10) as well as an outlet (11) joined with a feed (2) for at least one mould (1) at the first three-way valve element (5 or 7), an inlet (20) joined with a drain (3) of at least one mould (1), a connection (21) for a liquid drain and an outlet (22) for liquid and compressed gas at the second three-way valve element (6 or 48), an arrangement of channels (13–17; 25–29; 34–39) in the valve body (8, 19, 32) and the moving shut-off component (12, 24, 40–44) of the two linked three-way valve elements (5, 6; 7, 48)

for communication between the connection (9) for the liquid feed and the outlet (11) joined with the feed (2) for the mould (1) at the first three-way valve element (5, 7), as well as between the inlet (20) joined with the drain (3) of the mould (1) and the connection (21) for a liquid drain at the second three-way valve element (7, 48) with the linked three-way valve elements (5, 6; 7, 48) in a first position, for communication between the compressed gas connection (10) and the outlet (11) joined with the feed (2) of the mould (1) at the first three-way valve element (5, 7) as well as between the inlet (20) joined with the drain (3) of the mould (1) and the outlet (22) for liquid and compressed air at the second three-way valve element (7, 48)

with the linked three-way valve elements (5, 6; 7, 48) in a second position, and for blocking all connections, inlets and outlets (9, 10, 11; 20, 21, 22) at both three-way valve elements (5, 6; 7, 48) with the linked three-way valve elements (5, 6; 7, 48) in a third position.

2. Device according to claim 1, characterized by the fact that the three-way valve elements (5, 6) exhibit rotatable shut-off components (12, 24) which are connected one with another.

3. Device according to claim 2, characterized by the fact that the shut-off components comprise coaxial, conical plugs (12, 24).

4. Device according to claim 2, characterized by valve bodies (8, 19) for each shut-off component (12, 24) being joined one with another.

5. Device according to claim 2, characterized by a common valve body (32) for two shut-off components (40–44).

6. Device according to claim 1, characterized by shut-off components in the form of piston sliders (40–44).

7. Device according to claim 6, characterized by the piston sliders (40–44) of the two linked three-way valve elements (7, 48) being arranged coaxially.

* * * * *